(12) United States Patent
O'Neill et al.

(10) Patent No.: US 6,507,170 B2
(45) Date of Patent: Jan. 14, 2003

(54) BATTERY PACK HAVING A PLURALITY OF BATTERY SLOTS

(75) Inventors: Terrence J. O'Neill, Lake Geneva, WI (US); Fred Koermer, Lake Geneva, WI (US)

(73) Assignee: Quartex, Lake Geneva, WI (US)

( * ) Notice: Subject to any disclaimer, the term of this patent is extended or adjusted under 35 U.S.C. 154(b) by 0 days.

(21) Appl. No.: 09/955,927

(22) Filed: Sep. 19, 2001

(65) Prior Publication Data

US 2002/0036480 A1 Mar. 28, 2002

Related U.S. Application Data

(60) Provisional application No. 60/233,783, filed on Sep. 19, 2000.

(51) Int. Cl.[7] .............................................. H01M 10/46
(52) U.S. Cl. ....................................................... 320/107
(58) Field of Search ................................ 320/107, 110, 320/112; 429/99, 100

(56) References Cited

U.S. PATENT DOCUMENTS

| | | | |
|---|---|---|---|
| 4,818,928 A | | 4/1989 | Schosser |
| 5,204,608 A | * | 4/1993 | Koenck ....................... 320/112 |
| 5,260,636 A | * | 11/1993 | Leiserson et al. ........... 320/112 |
| 5,395,263 A | | 3/1995 | Sandell |
| 5,506,488 A | * | 4/1996 | Leiserson ................... 320/112 |
| 6,071,639 A | | 6/2000 | Bryant et al. |
| 6,271,644 B1 | | 8/2001 | Okada et al. |

* cited by examiner

*Primary Examiner*—Edward H. Tso
(74) *Attorney, Agent, or Firm*—Michael Best & Friedrich LLP

(57) ABSTRACT

A battery pack includes a case and an adapter contoured to mate with a battery socket of a power-consuming device. The battery socket is formed to receive an intended, standard-sized battery. The battery pack includes positive and negative leads electrically connecting the adapter to the case and two battery slots formed to receive intended, standard-sized batteries in parallel electrical communication with the positive and the negative leads.

18 Claims, 4 Drawing Sheets

BATTERY PACK HAVING A PLURALITY OF BATTERY SLOTS

CROSS-REFERENCE TO RELATED APPLICATIONS

This application claims priority under 35 U.S.C. §119 to provisional patent application Ser. No. 60/233,783 filed Sep. 19, 2000.

BACKGROUND AND SUMMARY OF THE INVENTION

The present invention relates to containers that hold and electrically connect batteries with power consuming devices, and particularly to battery packs that hold more than one battery.

Typical electrical devices such as clocks, children's toys, flashlights, radios, and the like are powered by one or more batteries. Generally, these devices are powered by conventional, commercially-available, sized/typed batteries, including but not limited to A, AA, AAA, D-cell, 9 volt, and C-cell batteries. These batteries are generally inserted into specially adapted slots/sockets/receptacles within the electrical device. The receptacles themselves are generally designed to accommodate only the specific size/type and number of batteries required to power the particular device. In this manner, the shape and size of the battery receptacle prevents the user from unwittingly using too many, too few, or the wrong size/type of batteries.

Battery receptacles are generally located on the back of or underneath the power consuming device. Replacing the batteries in these receptacles can be a relatively difficult and time-consuming process. In addition, many power-consuming devices such as radios, timepieces, and the like may "lose their memories" or reset when the batteries are removed and must be reprogrammed after the batteries are removed or replaced. It is therefore desirable to avoid having to change batteries or to limit the frequency of battery replacement. Those who use power-consuming devices would therefore welcome a battery pack, which allows for less frequent changing of batteries in a conventional electrical device.

According to the present invention, a battery pack includes a container or case, which contains two or more batteries. The battery pack is formed to be electrically coupled in a parallel circuit to an existing battery receptacle formed to receive fewer batteries than contained in the container of the battery pack. The battery pack includes an adapter, which electrically engages the existing battery receptacle and thereby electrically couples the battery receptacle to the container housing the two or more batteries.

In preferred embodiments, the container is formed to include two or more battery slots for holding the two or more batteries. The batteries are arranged in a parallel circuit, which is in electrical communication with the adapter. A negative and a positive lead extend through the case and the adapter, and engage negative and positive terminals in the battery receptacle, thereby electrically coupling the batteries in a parallel circuit to the power-consuming electrical device.

In this way, the power-consuming device draws power from two or more batteries at the same time. Therefore, the battery pack supplies the electrical device with power for a longer time than a single battery of the same voltage. Therefore, the time between battery replacement is increased. In addition, the battery pack preferably includes a lid, which encloses the batteries within the container.

Additional features and advantages will become apparent to those skilled in the art upon consideration of the following detailed description of the preferred embodiments exemplifying the best mode of carrying out the invention as presently perceived.

BRIEF DESCRIPTION OF THE DRAWINGS

The present invention is further described with reference to the accompanying drawings, which show certain embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

The detailed description particularly refers to the accompanying figures in which.

DETAILED DESCRIPTION OF THE DRAWINGS

Figure 1:
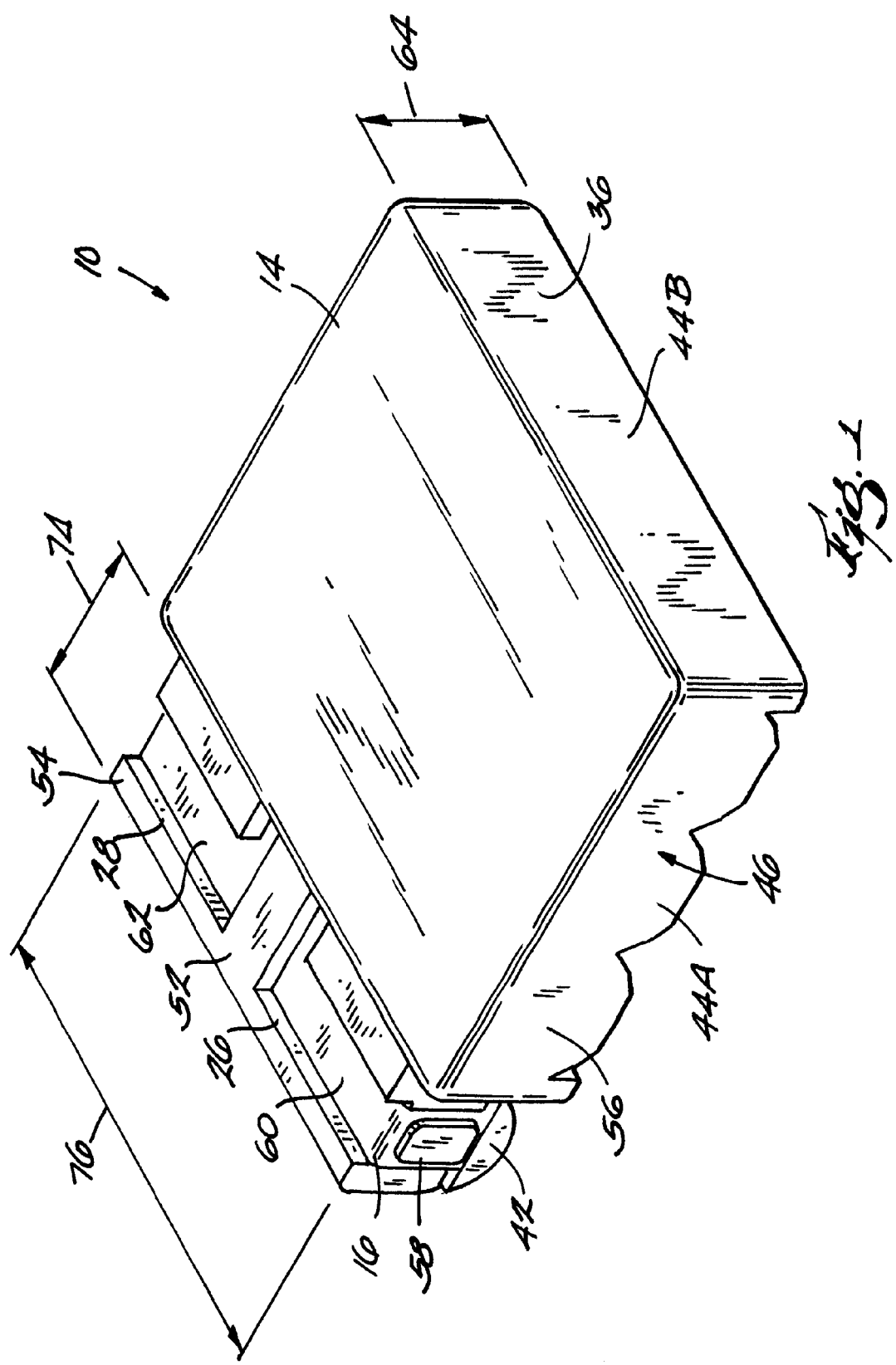
FIG. 1 is a perspective view of a battery pack in accordance with the present invention.

As shown in FIGS. 1–4, a battery pack 10 in accordance with the present invention includes a case or container 56 having a lid 14, an adapter/connector 54, a negative lead 60, a positive lead 62, and first, second, and third batteries 12A, 12B, 12C located in first, second, and third battery slots 30A, 30B, 30C, respectively, of the case 56.

The following description and accompanying figures describe the battery pack 10 according to the present invention as having a negative side 46 and positive side 48, with the negative ends of the batteries, leads, terminals, and contacts being located on one side of the battery pack 10 and the positive ends of the batteries, leads, terminals, and contacts being located on the other side of the battery pack 10. One having ordinary skill in the art will readily understand that the negative and positive ends of the batteries, leads, terminals, and contacts may be configured in any number of other orientations without departing from the spirit and scope of the present invention. In particular, the negative and positive sides of the battery pack 10 can be reversed. Additionally, the battery pack 10 may be configured so that some of the negative ends of the batteries, leads, terminals, and contacts are located on one side of the battery pack 10 and other of the negative ends of the batteries, leads, terminals, and contacts are located on the other side of the battery pack 10. Similarly, the battery pack 10 may be configured so that some of the positive ends of the batteries, leads, terminals, and contacts are located on one side of the battery pack 10 and other of the positive ends of the batteries, leads, terminals, and contacts are located on the other side of the battery pack 10. As will be described below, in each case the batteries will be electrically coupled in a parallel circuit with a battery receptacle/socket of an electrical device.

The case 56 is preferably made from a non-conductive material such as plastic, rubber, or the like. The particular shape and size of the case 56 is dictated by the size/type and number of batteries 12 desired for the particular application.

Figure 2:
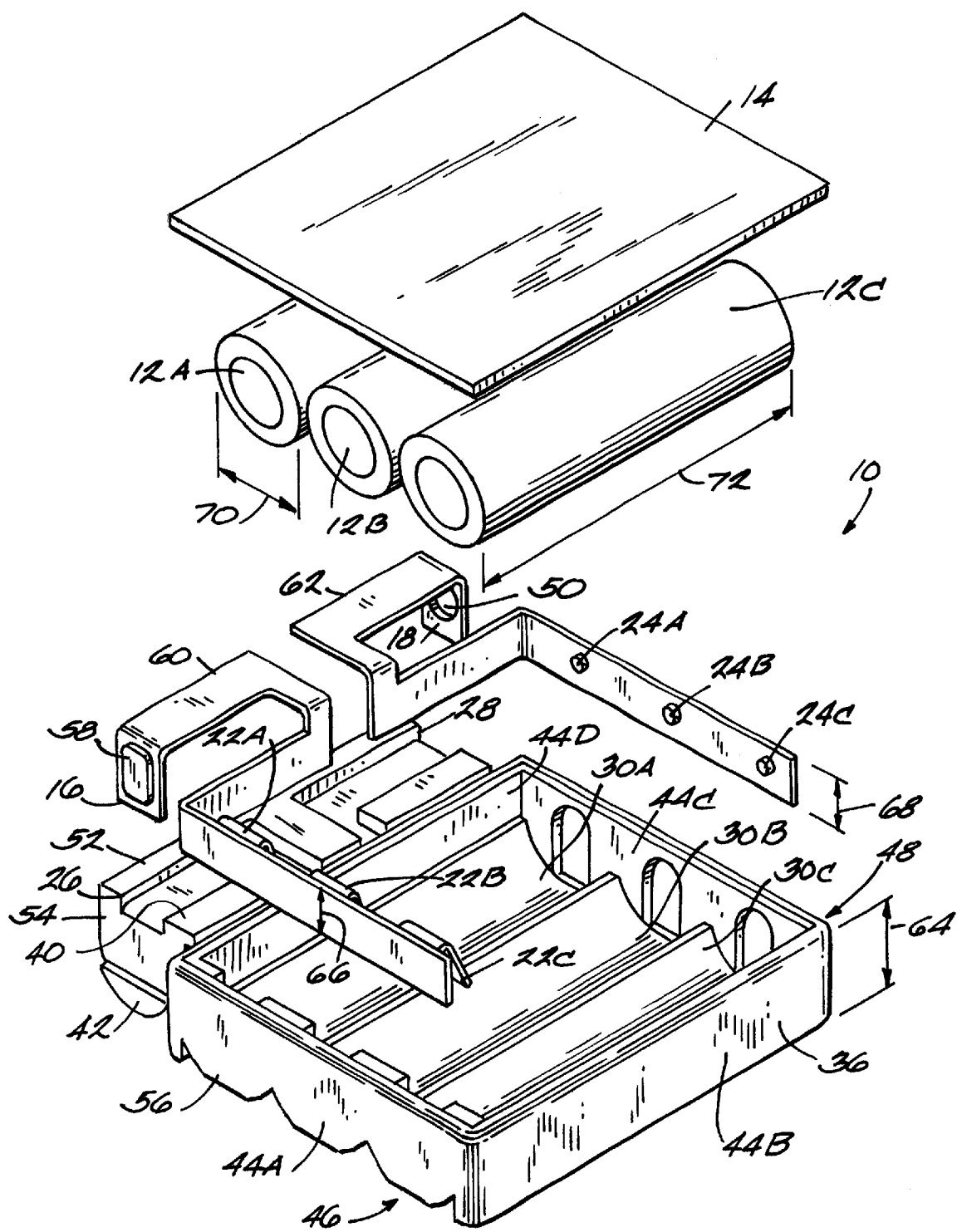
FIG. 2 is an exploded perspective view of the battery pack of FIG. 1.

In FIG. 2, three AA sized/typed batteries 12A, 12B, 12C are located in the case 56, which has a generally rectangular configuration bounded by first, second, third, and fourth side walls 44A, 44B, 44C, 44D. The first, second, third, and fourth side walls 44A, 44B, 44C, 44D extend around the case 56, defining a chamber for housing the batteries 12A, 12B, 12C within the case 56.

The battery slots 30A, 30B, 30C are formed within the case 56 and are contoured to each hold a single battery. The first, second, and third battery slots 30A, 30B, 30C are arcuately shaped to securely position cylindrically shaped AA sized/typed batteries 12A, 12B, 12C within the case 56.

The negative lead 60 and the positive lead 62 extend along the adapter and then substantially perpendicularly to the first, second, and third battery slots 30A, 30B, 30C into the case 56. The negative and positive leads 60, 62 are best shown in FIG. 2 as being substantially flat ribbons. However, in different applications, the positive and negative leads 60, 62 can be conventional wires, metallic plates, or any other conventional electrical connector.

The negative lead 60 extends along the negative side 46 of the battery pack 10 from the adapter 54, over the fourth side wall 44D, into the case 56, and down the first side wall 44A. The positive lead 62 extends along the positive side 48 of the battery pack 10 from the adapter 54, over the fourth side wall 44D, into the case 56, and down the third side wall 44C. Within the case 56, the height of the negative and positive leads 66, 68 is less than the height of the case walls 64 so that the negative and positive leads 60, 62 can be enclosed within the case 56 when the lid 14 is closed. The negative and positive leads 60, 62 are made from an electrically conductive material such as copper so that electrical current can flow from the batteries 12A, 12B, 12C, through the positive lead 62, into a power consuming device such as a clockworks 32, and back through the negative lead 60 to the batteries 12A, 12B, 12C.

The negative lead 60 has three negative contacts 22A, 22B, 22C. The negative contacts 22A, 22B, 22C are made from electrically conductive material such as copper and are preferably made from the same material as the negative and positive leads 60, 62. In FIG. 2, the negative contacts 22A, 22B, 22C are spaced along the first side wall 44A and are integrally formed with the negative lead 60. As shown in FIG. 2, the negative contacts 22A, 22B, 22C each have an upside-down V cofiguration, with one leg of the V integral with the negative lead 60 and the other leg of the V extending at an angle over the battery slots 30A, 30B, 30C, thereby providing a leaf spring arrangement. The spacing of the negative contacts 22A, 22B, 22C along the negative lead 60 is such that when batteries 12A, 12B, 12C are inserted into the battery slots 30A, 30B, 30C, the negative ends of the batteries 12A, 12B, 12C align with and electrically contact the negative contacts 22A, 22B, 22C.

The battery slots 30A, 30B, 30C are preferably just long enough to accommodate a single AA sized/typed battery in each slot 30A, 30B, 30C. Thus, when a battery 12 is inserted into any one of the battery slots 30A, 30B, 30C, the V-shaped negative contacts 22A, 22B, 22C are elastically deformed, with the two legs of the V being pushed together. In this manner, the negative contacts 22A, 22B, 22C apply a lateral spring force to the batteries 12A, 12B, 12C, forcing the batteries 12A, 12B, 12C against the positive contacts 24A, 24B, 24C. This lateral force secures the batteries 12A, 12B, 12C in their respective battery slots 30A, 30B, 30C.

The battery slots 30A, 30B, 30C are arranged so that the batteries 12A, 12B, 12C are connected in a parallel circuit. In this manner, the clockworks 32 can draw current from all three batteries 12A, 12B, 12C simultaneously, but maintain the voltage of each single battery 12A, 12B, 12C. Thus, the "life" of the battery pack 10 is approximately three times the "life" of a single AA battery. But, because the batteries 12A, 12B, 12C are arranged in parallel rather than in series, the voltage of the circuit does not exceed the intended voltage of the clockworks 32, which includes a battery receptacle intended for a single AA size/type battery.

Three positive contacts 24A, 24B, 24C are spaced along the positive lead 62. With reference to FIG. 2, the positive contacts 24A, 24B, 24C are round protrusions formed out of the positive lead 62 and protruding over the battery slots 30A, 30B, 30C. Each of the positive contacts 24A, 24B, 24C is aligned with a battery slot 30A, 30B, 30C so that when the batteries 12A, 12B, 12C are inserted into the battery slots 30A, 30B, 30C current can flow between the batteries 12A, 12B, 12C and the positive contacts 24A, 24B, 24C.

The adapter 54 is substantially rectangular and is coupled to the case 56 via an adapter shoulder 40. An adapter top 52 is also substantially rectangular, with a width 74 of the adapter 54 being substantially similar to a width 70 of a single battery intended to be inserted into the battery receptacle of the clockworks 32. Similarly, a length 76 of the adapter 54 is substantially similar to a length 72 of a single battery intended to be inserted into the battery receptacle of the clockworks 32. The adapter bottom 42 is arcuately shaped, mimicking the contour of a AA battery, so that the adapter 54 is insertable into the battery receptacle or slot 38 of the clockworks 32 or any other power consuming electrical device designed to accommodate a battery 12. The adapter 54 may be labeled to indicate how the adapter 54 should be inserted into the battery slot 38 of the clockworks 32. In particular, the adapter top 52 may have markings indicating the negative and positive terminals 16, 18.

Figure 3:
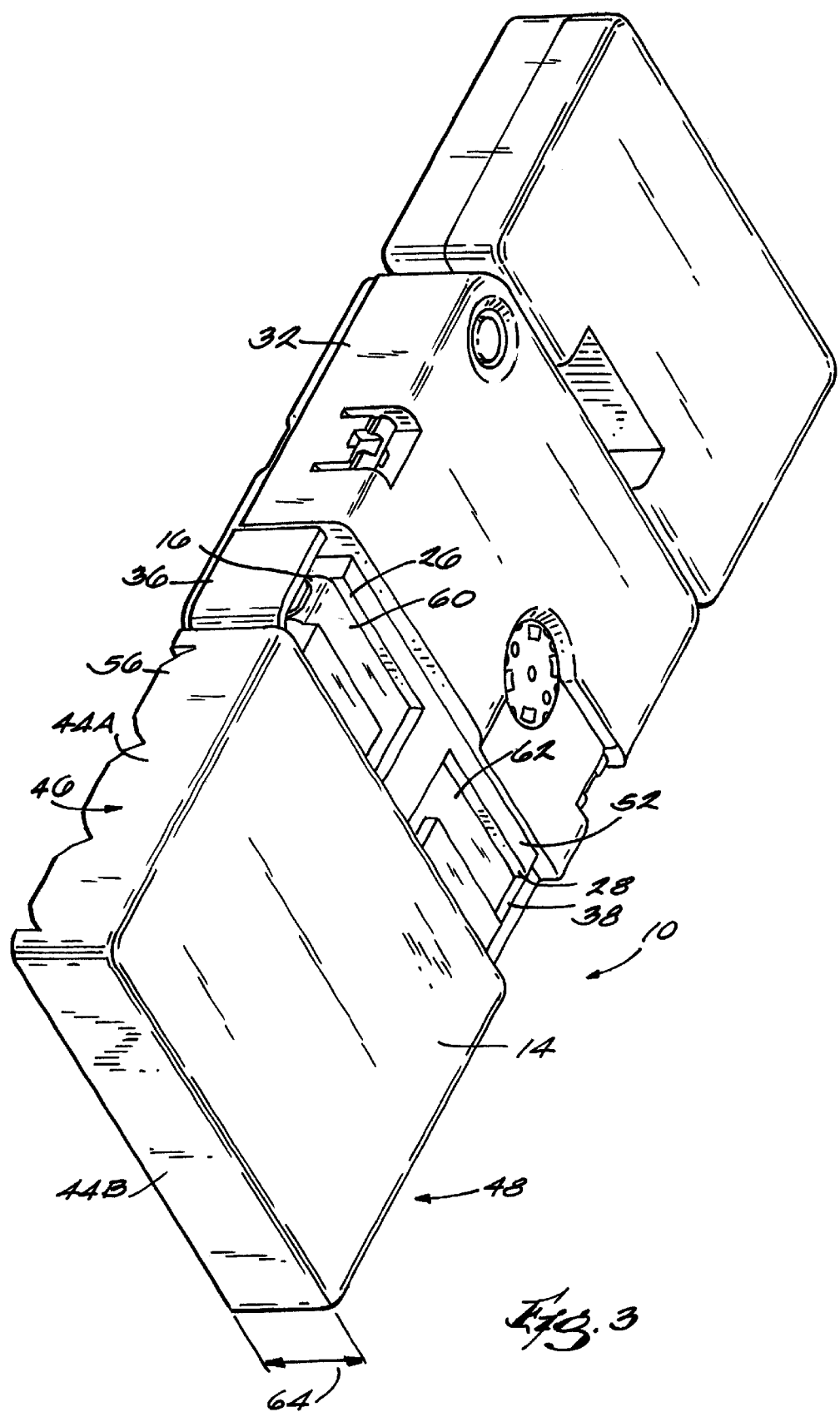
FIG. 3 is a perspective view of the battery pack of FIG. 1 coupled to a clockworks.

The adapter shoulder 40 extends from the adapter top 52, coupling the adapter 54 to the fourth case side wall 44D. The adapter shoulder 40, the fourth side wall 44D, and the adapter 54 define a gap (not shown) between the adapter 54 and the case 56. The gap is designed to receive a side wall 36 of the clockworks 32, or any other electrical device, as shown in FIG. 3, when the adapter 54 is inserted into the battery slot 38 of the clockworks 32.

There are two L-shaped groves on the adapter top 52. The first of these grooves is the negative lead slot 26. The negative lead slot 26 runs along the adapter top 52, parallel to the fourth side wall 44D. The negative lead slot 26 is contoured to receive a portion of the negative lead 60 which extends over the adapter shoulder 40, across the adapter top 52, and down one side of the adapter 54. In this manner, the negative lead 60 is generally surrounded and protected on three sides by the negative lead slot 26.

The second groove is the positive lead slot 28, which is located on the positive side of the battery pack 48 in FIG. 2. The positive lead slot 28 is also an L-shaped slot formed into the adapter top 52. The positive lead slot 28 is contoured to receive the positive lead 62 and generally surround the positive lead 62 on three sides.

A positive terminal 18 is located on the positive side 48 of the adapter 54 and is coupled to the positive lead 62. The positive terminal 18 is made of an electrically conductive material such as copper. As shown in FIG. 2, a circular protrusion 50 is formed in the positive terminal 18. The positive terminal 18 is formed to electrically engage the positive side of the battery slot 38 of the clockworks 32. In particular, the positive terminal 18 is formed to engage the positive contact (not shown) in the clockworks 32.

The negative terminal 16 is coupled to the negative lead 60, both of which are located on the negative side of the battery pack 46. The negative terminal 16 is formed to electrically engage the negative connector (not shown) in the battery slot 38 of the clockworks 38.

Some power-consuming devices, such as the clockworks 32, may be damaged if the batteries 12 are inserted backwards, with the positive ends of the batteries 12 contacting the negative contacts of the power-consuming device and the negative ends of the batteries 12 contacting the positive contacts of the power-consuming device. When this happens, current may flow through the power-consuming device "backwards," or in a manner not intended, and may damage the circuitry of the power-consuming device.

In order to avoid damaging a power-consuming device, such as the clockworks 32, the negative terminal 16 is provided with an ovular aperture 58, which extends through the negative terminal 16. The ovular aperture 58 is intended to prevent electrical contact between the positive contact (not shown) of a power-consuming device, such as the clockworks 32, and the negative terminal 16 of the battery pack 10. If the adapter 54 is inserted into the battery slot of a power consuming device 38 backwards, the positive contact (not shown) of the power-consuming device 32 (which is generally a relatively round knob or protrusion) extends into the ovular aperture 58 of the negative terminal 16 and makes no contact with the negative terminal 16. In this manner, the ovular aperture 58 prevents the negative terminal 16 from contacting the positive contact (not shown) of a power-consuming device, thereby preventing the user from inadvertently damaging the circuitry of the power-consuming device.

The lid 14 is coupled to the case 56, enclosing the batteries 12A, 12B, 12C within the case 56. The lid 14 is coupled to each of the first, second, third, and fourth side walls 44A, 44B, 44C, 44D. A fastener (not shown), such as a clip or screws, etc., holds the lid 14 on the case 56.

Figure 4:
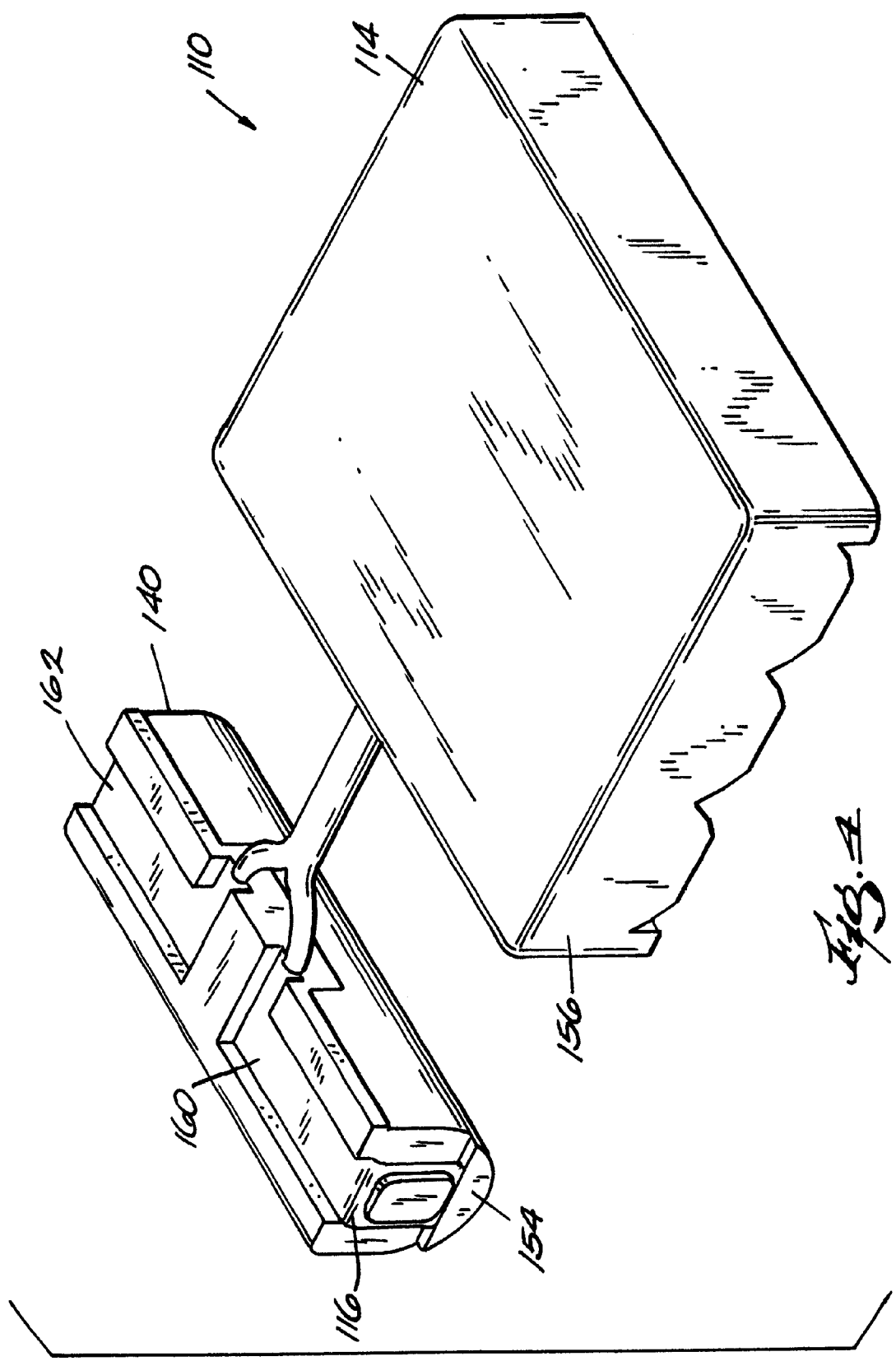
FIG. 4 is a perspective view of a battery pack in accordance with a second embodiment of the present invention.

Referring to FIG. 4, another embodiment of a battery pack 110 according to the present invention includes a case 156, an adapter 154, a negative lead 160, a positive lead 162, and a lid 114. In this embodiment, the adapter 154 and the case 156 are spaced apart, coupled together by the negative and positive leads 160, 162. Because the adapter 154 and the case 156 are spaced apart, the adapter 154 can be inserted into the battery slot of a power-consuming device (not shown) and the case 156 can be positioned in a relatively remote or variable location. In this manner, the battery pack 110 may be positioned relatively more inconspicuously on or near the power-consuming device (not shown). Additionally, because the adapter 154 is coupled to the case 156 by flexible negative and positive leads 160, 162, it can be inserted into the battery slot of a power-consuming device (not shown) which has a relatively inaccessible opening.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, the battery pack 10 can include two, four, or any other number of battery slots, all of which can provide additional functional "life" to the battery pack 10. Additionally, the battery pack 10 is may contain conventional batteries such as A, AA, AAA, C-cell, D-cell, and 9-volt batteries or with less common batteries such as 12-volt, 1.5-volt, and 3.6-volt batteries etc.

Although the invention has been described in detail with reference to certain preferred embodiments, variations and modifications exist within the scope and spirit of the invention as described in the following claims.

What is claimed is:

1. A battery pack for use with battery operated devices having a battery socket for receiving a AA battery, the battery socket having a socket length, a socket width, and spaced-apart positive and negative contacts to engage the positive and negative terminals of the AA battery, the battery pack comprising:

a case formed to include a first battery slot and a second battery slot, each battery slot having a positive and a negative end and being formed to receive the AA battery between the positive and negative end of each slot;

a connector coupled to the case and including spaced-apart positive and negative terminals, the connector having a connector length and a connector width, the connector width and the connector length being substantially similar to the socket length and socket width, respectively, the connector formed to be received by the battery socket with the positive terminal of the connector contacting the positive contact of the battery socket and the negative terminal of the connector contacting the negative contact of the battery socket;

a positive lead electrically connecting the positive end of the first battery slot, the positive end of the second battery slot, and the positive terminal of the connector; and a negative lead electrically connecting the negative end of the first battery slot, the negative end of the second battery slot, and the negative terminal of the connector.

2. The battery pack of claim 1, wherein the case and the connector define a gap extending between the connector and the case and the positive and negative leads span the gap.

3. The battery pack of claim 1, wherein the connector is fixedly coupled to the case.

4. The battery pack of claim 1, wherein the case includes a third battery slot having a positive and a negative end and being formed to receive a AA battery between the positive and negative ends, and wherein the positive lead is electrically connected to the positive end of the third battery slot and the negative lead is electrically connected to the negative end of the third battery slot.

5. The battery pack of claim 4, wherein the battery socket, the connector, and each of the first, second, and third battery slots includes a longitudinal axis and all of the longitudinal axes are substantially parallel and lie substantially in a single plane.

6. The battery pack of claim 1, wherein the battery socket, the connector, and each of the first and second battery slots include a longitudinal axis and all of the longitudinal axes are substantially parallel and lie substantially in a single plane.

7. A battery pack for supplying power to a battery powered device, the battery powered device having a battery socket, the battery socket formed to receive a particular sized battery, the battery pack comprising:

a connector having substantially the same dimensions as the particular sized battery, the connector having a first end and a second end, and being formed to be received in the battery socket;

a battery case coupled to the connector and having a plurality of battery slots, each of the plurality of battery slots having a first slot end and a second slot end and each of the plurality of battery slots being adapted to receive the particular sized battery;

a negative terminal coupled to the first end of the connector and adapted to electrically engage the battery socket;

a positive terminal coupled to the second end of the connector and adapted to electrically engage the battery socket;

a negative lead coupled to the negative terminal and extending into the battery case, the negative lead electrically connecting the first slot end of each of the plurality of battery slots with the negative terminal; and a positive lead coupled to the positive terminal and extending into the battery case, the positive lead electrically connecting the second slot end of each of the plurality of battery slots with the positive terminal.

8. The battery pack of claim 7, wherein the particular sized battery is a AA battery.

9. The battery pack of claim 7, wherein the battery case is fixedly coupled to the connector.

10. The battery pack of claim 7, wherein the battery socket, the connector, and each of the plurality of battery slots includes a longitudinal axis and all of the longitudinal axes are substantially parallel and lie substantially in a single plane.

11. A battery pack for supplying power to a battery powered device, the battery powered device having a battery socket formed to receive a battery of a first length and a first width, the battery socket including a negative contact to electrically engage the negative end of the battery and a positive contact to electrically engage the positive end of the battery, the positive contact spaced the first length from the negative contact, the battery pack comprising:

a connector having a second width and a positive terminal and a negative terminal spaced the first length apart, the positive terminal adapted to electrically engage the positive contact of the battery socket, and the negative terminal adapted to electrically engage the negative contact of the battery socket, the first and second widths being substantially equal; and a battery case coupled to the connector and having a plurality of battery slots, each of the plurality of battery slots having a first end and a second end and each of the plurality of battery slots being adapted to receive the battery of the first length, the first ends of the slots electrically connected to the positive terminal, the second ends of the slots electrically connected to the negative terminal.

12. The battery pack of claim 11, wherein the connector is fixedly coupled to the case.

13. The battery pack of claim 11, wherein the battery of the first length is a AA battery.

14. The battery pack of claim 11, wherein the battery socket, the connector, and each of the plurality of battery slots includes a longitudinal axis and all of the longitudinal axes are substantially parallel and lie substantially in a single plane.

15. The battery pack of claim 11, wherein the case and the connector define a gap extending between the connector and the case and the positive and negative leads span the gap.

16. A method of powering a battery powered device with a battery pack, the battery powered device having a battery socket having a positive and a negative contact, the battery socket formed to receive a particular sized battery, the method comprising:

electrically connecting in parallel a plurality of the particular sized battery;

electrically coupling the plurality of the particular sized battery to a connector having a positive and a negative terminal, the positive terminal being electrically coupled to a positive terminal of each of the plurality of the particular sized battery, the negative terminal being electrically coupled to a negative terminal of each of the plurality of the particular sized battery, the connector being formed for insertion into the battery socket; and inserting the connector into the battery socket with the positive terminal electrically contacting the positive contact and the negative terminal electrically contacting the negative contact.

17. The method of claim 16, wherein each of the plurality of the particular sized battery, the connector, and the battery socket include a longitudinal axis and each is positioned so that the axes are substantially parallel and lie substantially in a single plane.

18. The method of claim 16, wherein the particular sized battery is a AA sized battery.

* * * * *